United States Patent
Shen et al.

(10) Patent No.: US 6,793,721 B2
(45) Date of Patent: Sep. 21, 2004

(54) INVISIBLE INK COMPOSITION AND METHOD TO ENSURE DOCUMENT CONFIDENTIALITY

(75) Inventors: Yu-Chang Shen, Taipei (TW); In-Shan Sir, Kaohsiung (TW); Chia-Hsin Chien, Taoyuan (TW); Yu-Ting Lin, Lujou (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 10/293,603

(22) Filed: Nov. 14, 2002

(65) Prior Publication Data

US 2003/0089270 A1 May 15, 2003

(30) Foreign Application Priority Data

Nov. 14, 2001 (TW) ............................... 90128261 A

(51) Int. Cl.[7] .................... C09D 11/00; B44F 1/12; B42D 15/10
(52) U.S. Cl. .................... 106/31.2; 427/7; 283/72
(58) Field of Search ................... 106/31.2; 427/7; 283/72

(56) References Cited

U.S. PATENT DOCUMENTS

| | | | |
|---|---|---|---|
| 4,111,462 A | * | 9/1978 | Lange et al. ............ 503/206 |
| 4,205,865 A | * | 6/1980 | Lange et al. ............ 503/206 |
| 4,682,194 A | * | 7/1987 | Usami et al. ........... 503/215 |
| 4,742,043 A | * | 5/1988 | Tanaka et al. .......... 503/213 |
| 4,784,876 A | | 11/1988 | Walker, Jr. et al. |
| 5,035,743 A | * | 7/1991 | Amon et al. .......... 106/31.14 |
| 5,209,515 A | * | 5/1993 | Dotson et al. .......... 283/95 |
| 5,421,869 A | | 6/1995 | Gundjian et al. |
| 5,774,160 A | * | 6/1998 | Gundjian ............... 347/171 |
| 5,883,043 A | * | 3/1999 | Halbrook et al. ....... 503/204 |
| 5,953,037 A | * | 9/1999 | Hayashi et al. ........ 347/172 |
| 6,060,426 A | * | 5/2000 | Tan et al. .............. 503/200 |
| 6,203,603 B1 | * | 3/2001 | Takayama et al. ..... 106/31.16 |

* cited by examiner

Primary Examiner—Mark L. Bell
Assistant Examiner—Veronica F. Faison
(74) Attorney, Agent, or Firm—Rabin & Berdo, P.C.

(57) ABSTRACT

An invisible ink composition and a method to ensure document confidentiality. The invisible ink composition includes a carrier as a solvent; and at least one leuco dye evenly dispersing in the carrier. The invisible ink becomes visible while the leuco dye is combined with a weak acidic developer.

23 Claims, 1 Drawing Sheet

INVISIBLE INK COMPOSITION AND METHOD TO ENSURE DOCUMENT CONFIDENTIALITY

This application incorporates by reference of Taiwan application Serial No. 090128261, filed Nov. 14, 2001.

BACKGROUND OF THE INVENTION

1. Field of the Invention

The invention relates in general to security printing, and more particularly to the composition of an invisible ink.

2. Description of the Related Art

Invisible ink systems have been used for centuries. As is known, a colorless liquid A is used to form images on a document which thus results in an invisible text. At the receiving end the images formed by the colorless liquid A are revealed or rendered visible by either changing the pH value or by applying a second or activating liquid B to the paper. The chemical reaction of liquid A and liquid B can be an oxidation-reduction reaction, complexation, precipitation or catalytic reaction.

The reaction of a liquid, containing $(NH_4)_2S$ and a second liquid, including $Ag(NO_3)$ produces precipitation and is widely applied to the latent image technology. The application of the basic solution, including 0.5M of NaOH and the acidic solution, including 0.1M of HCl and indicator is another example. However, these two typical latent image technologies couldn't be applied to ink-jet printing and the resultant documents have very limited period of storage.

U.S. Pat. No. 5,395,432 taught the use of certain ink-jet compositions for use in printing latent images on a substrate. In accordance with that patent, ink jet compositions comprising zinc chloride were taught for use in making latent images. U.S. Pat. No. 6,106,110 enables the printing of a secure image, which is invisible to the naked or unaided human eye in normal visible light or with the use of ultraviolet or infrared light illumination. The secure image should only be revealed on demand after a substrate is subjected to a subsequent process of image activation. However, the colorless thermal ink-jet ink contains zinc compounds and the main ingredient of the color developer is organic solvent with other organic compounds, which have high toxicity. Thus, the invisible inks disclosed by the two aforementioned inventions are not ideal for use in offices.

SUMMARY OF THE INVENTION

It is therefore an object of the invention to provide an invisible ink with long storage time and high safety.

According to a preferred embodiment of the invention, an invisible ink composition is disclosed. The invisible ink composition comprises a carrier as a solvent; and at least one microencapsulated leuco dye evenly dispersing in the carrier. The invisible ink becomes visible while the microencapsulated leuco dye is combined with a developer.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1:
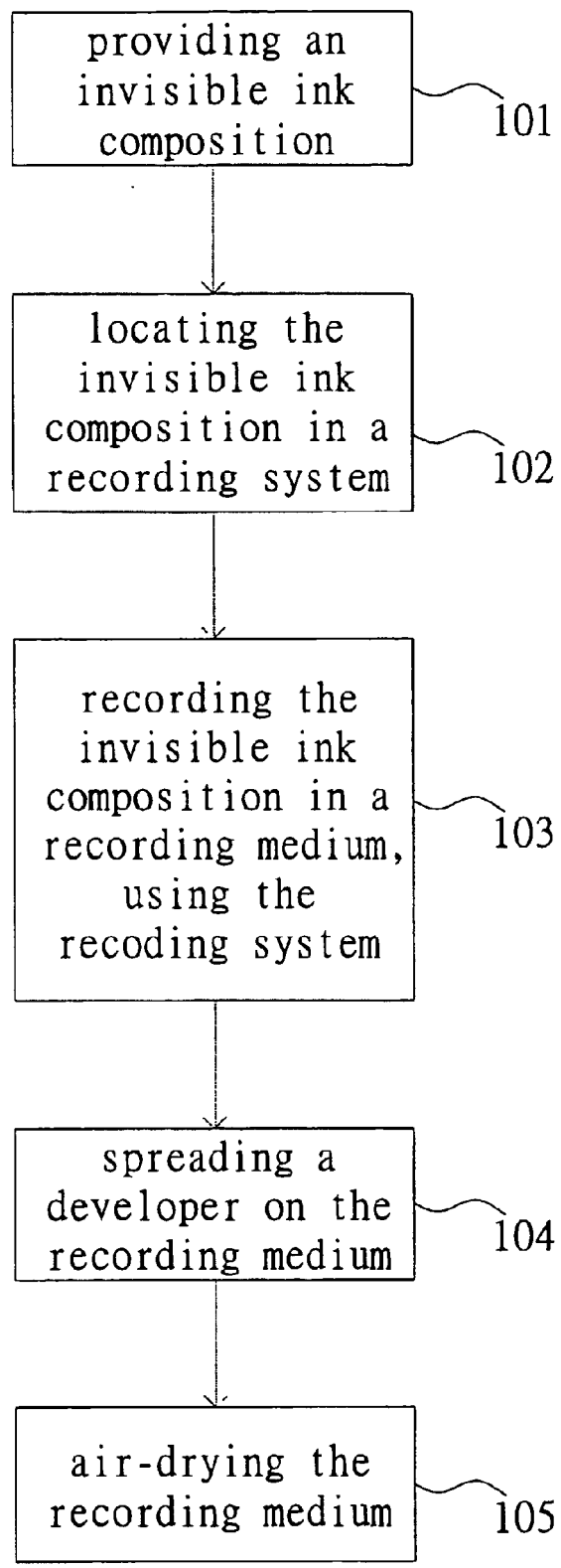
FIG. 1 shows a flow chart illustrating a method to ensure document confidentiality.

The invisible ink composition of the invention can be applied to both full-color ink-jet printing technology and screen printing technology. The leuco dye preferably includes four basic leuco dyes, magenta leuco dye, cyan leuco dye, yellow leuco dye and black leuco dye. Light magenta leuco dye, light cyan leuco dye, light yellow leuco dye, orange leuco dye and green leuco dye can be further included to obtain a full-color images. The amount of the microencapsulated leuco dye of the invention can be in the range of about 1 wt %–15 wt %, preferably about 1 wt %–7 wt %.

Either water-soluble or solvent leuco dye can be utilized in the invisible ink composition. A solvent leuco dye, typically in the form of white power, can be directly dissolved or microencapsulated then dispersed in an organic solvent system. The organic solvent dissolved with the solvent leuco dye is a colorless solution. The solvent leuco dye can be also evenly microencapsulated then dispersed in an aqueous system. With the aid of microencapsulation, which encapsulates the solvent leuco dye by a layer of polymer, even distribution of solvent leuco dye in carrier can be therefore realized. The particle size of representative microcapsules is about 0.01 $\mu$m~5 $\mu$m. However, to meet the size of a typical nozzle hole, which has a diameter of 20 $\mu$m~50 $\mu$m, the microcapsules encapsulating solvent leuco dye of the invention are preferably less than 1 $\mu$m. The microencapsulated solvent leuco dye can be released by pressing, photo, or heating the microcapsules. After the solvent leuco dye is released and mixes with the developer, the oxidation-reduction reaction causes the latent images and texts visible.

The invisible ink composition of the invention can be applied to both full-color ink-jet printing technology and screen printing technology. The leuco dye preferably includes four basic leuco dyes, magenta leuco dye, cyan leuco dye, yellow leuco dye and black leuco dye. Light magenta leuco dye, light cyan leuco dye, light yellow leuco dye, orange leuco dye and green leuco dye can be further included to obtain a full-color images. The amount of the microencapsulated leuco dye of the invention can be in the range of about 1 wt %~15 wt %, preferably about 1 wt %~7 wt %.

The developer of the invention is an acidic solution, comprising acidic compound and electrolyte. The preferred amount of the acidic compound is about 0.01 wt %~15 wt % and the preferred amount of the electrolyte is about 0.01 wt %~10 wt %. The electrolyte can be inorganic salt, used for accelerating the speed of developing after the leuco dye and the developer are mixed. The developer can further comprise buffer for preventing the developer from deterioration and for keeping the developer in an ideal pH value, not producing environmental pollution. Further more, the adding of biocide and preservative prevents the growth of germs. The chelating agent prevents the inorganic salt in the invisible ink from crystallization.

The carrier of the invention can be an aqueous system or an organic solvent system. The carrier preferably comprises an aqueous solvent, an organic solvent, a surfactant, a humectant, a pH buffer, a chelating agent, a biocide, a preservative, and an UV-absorber.

A surfactant is also a preferred additive of the invisible ink. The surfactant is frequently used to reduce the surface tension of a solution, enhance the humidity of the ink, and function as a dispersant. In general application, one or more than one surfactant, including anionic type, nonionic type, cationic type and amphoteric type surfactant, is added. The amount of the surfactant is in a range to provide the invisible ink proper physical property, preferably of about 0.01 wt %~10 wt %.

To prevent the clogging of the nozzle, a humectant, which slows down the speed of ink evaporation can be added. Humectants with low volatility and high solubility in invisible ink are preferred. Humectants can be any one or any combination of the following: ethylene glycol, diethylene glycol or glycerol, and has an amount in a range of about 1 wt %–20 wt %.

A biocide, a preservative, an UV absorbent, a chelating agent and a pH buffer are further examples of the preferred additives. The biocide and preservative inhibit the growing of the bacteria and prevent the ink from deteriorating. The UV absorbent enhances the light-fastness of the ink. The chelating agent prevents the crystallization of the salt and the consequential nozzle clogging. The pH buffer maintains the invisible ink in an ideal pH value to develop desired color.

Two examples according to a preferred embodiment of the invention are taken to further illustrate the spirit of the invention.

EXAMPLE 1

| | ADDITIVE | | AMOUNT (wt %) |
|---|---|---|---|
| Black, Yellow, Cyan, and Magenta invisible ink composition | Microcapsuled Black, Yellow, Cyan, and Magenta leuco dye, according to the color of the invisible ink | | 5 for each |
| | Carrier | Surfactant | 5 |
| | | Organic solvent | 5 |
| | | Aqueous solvent | 75 |
| | | pH buffer, Dispersant, Chelating agent, Biocide, Preservative, UV-absorber | for balancing |
| Developer | | Weak acidic agent | 1 |
| | | pH buffer | 0.5 |
| | | Inorganic salt | 2 |
| | | Preservative | 0.3 |
| | | Aqueous solvent | for balancing |

Commercial full-color ink-jet printers are used to jet the aforementioned invisible ink onto the commercial plain paper. The pH value of the plain paper surface is about 7 to 10. Then, the plain paper is spread with the developer and air-dried. Because leuco dyes with various colors are provided, developed plain papers are able to appear all the provided colors.

EXAMPLE 2

| | ADDITIVE | | AMOUNT (wt %) |
|---|---|---|---|
| Black, Yellow, Cyan, and Magenta invisible ink composition | Black, Yellow, Cyan, and Magenta leuco dye | | 5 for each |
| | Carrier | Surfactant | 5 |
| | | Organic solvent | 80 |
| | | pH buffer, Dispersant, Chelating agent, | for balancing |

-continued

| | ADDITIVE | AMOUNT (wt %) |
|---|---|---|
| | Biocide, Preservative, UV-absorber | |
| Developer | Weak acidic agent | 1 |
| | pH buffer | 0.5 |
| | Inorganic salt | 2 |
| | Preservative | 0.3 |
| | Aqueous solvent | for balancing |

Commercial screen printing machines are used to print the aforementioned invisible ink onto the commercial plain paper. Then, the plain paper is spread with the developer and air-dried. Because leuco dyes with various colors are provided, developed plain papers are able to appear all the provided colors.

Referring to FIG. 1, a flow chart illustrating a method to ensure document confidentiality is shown. In the step 101, an invisible ink composition, which comprises a carrier as a solvent and a leuco dye evenly distributing in the carrier, is provided. Then, in the step 102, the invisible ink is located in a recording system. In the step 103, the invisible ink of the invention is then recorded on a recording medium with a pH value of about 7 to 10. The recording medium can be a plain paper. After the document printed by the invisible ink is forwarded to the intended recipient, a developer is spread on the recording medium to develop a full-color document, as shown in the step 104. Finally, the step 105 to air-dry the developed document is performed.

The invisible ink composition of the invention, used to ensure the confidentiality of a document, includes at least the following advantages:

(1) Either water-soluble or oil-soluble leuco dye can be applied in the invisible ink composition. An oil-soluble leuco dye can be directly dissolved or microencapsulated then dispersed in a system of organic solvent or be evenly dispersed in an aqueous system by microencapsulation.

(2) The latent images and texts on the recording media can be developed simply by spreading an acidic developer. Compared with the conventional use of ultraviolet or infrared light illumination, the invisible ink of the invention and the method of producing the latent images thereof are much lower in cost. Thus, it is ideal for use in offices as well as for personal utilization.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An invisible ink composition, comprising:
   a carrier as a solvent; and
   at least one microencapsulated leuco dye evenly dispersing in the carrier,
   wherein the invisible ink becomes visible while the leuco dye combines with a developer, and wherein the carrier is an aqueous solution and the leuco dye evenly disperses in the aqueous solution.

2. The invisible ink composition as claimed in claim 1, wherein the leuco dye is selected from the group consisting of magenta leuco dye, cyan leuco dye, yellow leuco dye, black leuco dye, light magenta leuco dye, light cyan leuco dye, light yellow leuco dye, orange leuco dye and green leuco dye.

3. The invisible ink composition as claimed in claim 1, wherein the carrier comprises: a surfactant, an organic solvent, an aqueous solvent, a humectant, a Ph buffer, a dispersant, a chelating agent, a biocide, a preservative and a UV-absorber.

4. The invisible ink composition as claimed in claim 1, wherein the developer comprises an acidic compound, an electrolyte, a Ph buffer, a biocide, a preservative and a chelating agent.

5. The invisible ink composition as claimed in claim 4, wherein the acidic compound has a weight percentage of about 0.01 wt % to 15 wt %.

6. The invisible ink composition as claimed in claim 1, wherein the leuco dye has a weight percentage of about 1 wt % to 15 wt %.

7. A method to ensure document confidentiality, comprising the steps of:
   providing at least one invisible ink, which comprises:
      a carrier as a solvent; and
      a microencapsulated leuco dye evenly dispersing in the carrier,
      wherein the invisible ink becomes visible while the leuco dye combines with a developer, wherein the carrier is an aqueous solution and the leuco dye evenly disperses in the aqueous solution;
   disposing the invisible ink in a recording system; and
   recording the invisible ink on a recording media.

8. The method as claimed in claim 7, wherein the leuco dye is selected from the group consisting of magenta leuco dye, cyan leuco dye, yellow leuco dye, black leuco dye, light magenta leuco dye, light cyan leuco dye, light yellow leuco dye, orange leuco dye and green leuco dye.

9. The method as claimed in claim 7, wherein the leuco dye at least comprises cyan leuco dye, magenta leuco dye, and yellow leuco dye to perform full-color recording.

10. The method as claimed in claim 7, wherein the carrier comprises: a surfactant, an organic solvent, an aqueous solvent, a humectant, a Ph buffer, a dispersant, a chelating agent, a biocide, a preservative and a UV-absorber.

11. The method as claimed in claim 7, wherein the developer comprises an acidic compound, an electrolyte, a Ph buffer, a biocide, a preservative and a chelating agent.

12. The method as claimed in claim 11, wherein the acidic compound has a weight percentage of about 0.01 wt % to 15 wt %.

13. The method as claimed in claim 7, wherein the recording system is an ink-jet printing apparatus.

14. The method as claimed in claim 7, wherein the recording system is a screen printing apparatus.

15. A method to ensure document confidentiality, comprising the steps of:
   providing at least one invisible ink, which comprises:
      a carrier as a solvent; and
      a microencapsulated leuco dye evenly dispersing in the carrier,
      wherein the invisible ink becomes visible while the leuco dye is combined with a developer;
   disposing the invisible ink in a recording system; and
   recording the invisible ink on a recording media, wherein a recording side of the recording medium has a Ph value of about 7 to 10.

16. The method as claimed in claim 7, wherein the leuco dye has a weight percentage of about 1 wt % to 15 wt %.

17. The method as claimed in claim 15, wherein the carrier is an aqueous solution and the leuco dye evenly disperses in the aqueous solution.

18. The method as claimed in claim 15, wherein the carrier is an organic solution and the leuco dye evenly disperses in the organic solvent.

19. The method as claimed in claim 15, wherein the leuco dye is selected from the group consisting of magenta leuco dye, cyan leuco dye, yellow leuco dye, black leuco dye, light magenta leuco dye, light cyan leuco dye, light yellow leuco dye, orange leuco dye and green leuco dye.

20. The method as claimed in claim 15, wherein the carrier comprises: a surfactant, an organic solvent, an aqueous solvent, a humectant, a Ph buffer, a dispersant, a chelating agent, a biocide, a preservative and a UV-absorber.

21. The method as claimed in claim 15 wherein the developer comprises an acidic compound, an electrolyte, a Ph buffer, a biocide, a preservative and a chelating agent.

22. The method as claimed in claim 21, wherein the acidic compound has a weight percentage of about 0.01 wt % to 15 wt %.

23. The method as claimed in claim 15, wherein the leuco dye has a weight percentage of about 1 wt % to 15 wt %.

* * * * *